United States Patent
Rist et al.

(10) Patent No.: US 10,972,517 B2
(45) Date of Patent: Apr. 6, 2021

(54) METHOD FOR IMPLEMENTING A CALL CONTROL OF A CLIENT ON A TELEPHONY ENDPOINT REPRESENTING A USER, AND PORT HANDLER DESIGNED THEREFOR

(71) Applicant: Unify GmbH & Co. KG, Munich (DE)

(72) Inventors: Claus Rist, Bochum (DE); Norbert Schonfeld, Dortmund (DE)

(73) Assignee: Unify GmbH & Co. KG, Munich (DE)

( * ) Notice: Subject to any disclaimer, the term of this patent is extended or adjusted under 35 U.S.C. 154(b) by 298 days.

(21) Appl. No.: 16/073,070

(22) PCT Filed: Jan. 26, 2017

(86) PCT No.: PCT/EP2017/051695
§ 371 (c)(1),
(2) Date: Jan. 11, 2019

(87) PCT Pub. No.: WO2017/129707
PCT Pub. Date: Aug. 3, 2017

(65) Prior Publication Data
US 2019/0141096 A1    May 9, 2019

(30) Foreign Application Priority Data
Jan. 27, 2016   (DE) .......................... 102016000870.9

(51) Int. Cl.
*H04L 29/06*    (2006.01)

(52) U.S. Cl.
CPC ........ *H04L 65/1096* (2013.01); *H04L 65/105* (2013.01); *H04L 65/1046* (2013.01); *H04L 65/1053* (2013.01)

(58) Field of Classification Search
CPC ............... H04L 65/1096; H04L 65/105; H04L 65/1053; H04L 65/1046
See application file for complete search history.

(56) References Cited

U.S. PATENT DOCUMENTS

| | | | | |
|---|---|---|---|---|
| 6,058,178 | A | * | 5/2000 | McKendry ............... H04M 3/46 379/211.01 |
| 2003/0016811 | A1 | * | 1/2003 | Milton ............... H04M 3/42314 379/245 |

(Continued)

FOREIGN PATENT DOCUMENTS

EP              2479969 A1    7/2012

OTHER PUBLICATIONS

PCT International Search Report and Written Opinion for PCT/EP2017/051695 filed Jan. 26, 2017, dated Apr. 21, 2017.

*Primary Examiner* — Walli Z Butt
(74) *Attorney, Agent, or Firm* — Buchanan Ingersoll & Rooney PC

(57)  ABSTRACT

The invention concerns a computer-implemented method for executing call control for a client (Cl1) on a telephone terminal (30) representing a user (U1), comprising the following steps:
a logic unit (L1) of a port handler (20) transmits a first call (C1) through a first trunk receiving unit (ET1) representing a first trunk (T1) to a first sending unit (SU1) assigned to the user (U1),
by processing a first identification (ID1) received through the first trunk receiving unit (ET1), the logic unit (L1) assigns the first trunk receiving unit (ET1) and the first call (C1) to the user (U1), using an appropriately structured database DB1 and allocation table (Z1),
the logic unit (L1) transmits at least a second call (C2) through a second trunk receiving unit (ET2) representing at least one second trunk (T2) also to the sending unit (SU1) assigned to the user (U1),
by processing a second identification (ID2) received through the second trunk receiving unit (ET2), the logic unit (L1) assigns the second trunk receiving unit (ET2)

(Continued)

and the at least one second call (C2) also to the user (U1), using the database (DB1) and allocation table (Z1), and the switching-capable sending unit (SU1) assigned to the user (U1) and a switching-capable receiving unit (EU1) assigned to the user (U1) use the client (CI1) to effect call control for the first call (C1) and the at least one second call (C2) to the telephone terminal (30) representing the user (U1).

The invention further concerns an appropriately configured port handler and a machine-readable data carrier (90) with a computer program product stored on it.

16 Claims, 13 Drawing Sheets

(56) References Cited

U.S. PATENT DOCUMENTS

| | | |
|---|---|---|
| 2007/0121602 A1 | 5/2007 | Sin et al. |
| 2010/0220849 A1* | 9/2010 | Colbert .................. H04M 3/20 |
| | | 379/208.01 |
| 2015/0016600 A1 | 1/2015 | Desai et al. |
| 2015/0063172 A1* | 3/2015 | Taylor ................. H04L 65/1033 |
| | | 370/259 |
| 2016/0006794 A1 | 1/2016 | Acosta Amador |

* cited by examiner

METHOD FOR IMPLEMENTING A CALL CONTROL OF A CLIENT ON A TELEPHONY ENDPOINT REPRESENTING A USER, AND PORT HANDLER DESIGNED THEREFOR

CROSS-REFERENCE TO RELATED APPLICATIONS

This application is the United States national phase under 35 U.S.C. § 371 of PCT International Patent Application No. PCT/EP2017/051695, filed on Jan. 26, 2017, which claimed benefit of priority of German Application No. DE10 2016 000 870.9, filed on Jan. 27, 2016.

BACKGROUND OF THE INVENTION

Field of the Invention

This invention concerns a method for executing call control for a client on a telephone terminal representing a user as well as a computer program product for implementing the method, a machine-readable data carrier with the computer program product stored on it, and an appropriately configured port handler.

Background of the Related Art

The following terms are briefly explained for use in the following description:

A telecommunication platform (also called a TC platform) is a switching center or telecommunications installation, for example (also called a PBX or "Private Branch Exchange"). Such TC platforms offer mostly SIP-based VoIP/Video-over-IP technologies. A telephone terminal is, for example, a telephone, smartphone, computer used to establish or operate a telephone connection ("call") or a data connection, or another—possibly virtual—type of terminal device.

A Cloud communication server (CCS) is, for example, a SaaS Cloud platform for collaborative cross-team work. It allows teams to receive what they need for effective communication in a single client (also called a CCS client).

A CCS client is, for example, an application software (app) that combines voice, video, screen sharing, messaging, chat, file sharing, etc., making collaborative work easy and trouble-free. Such a CCS client on a Cloud communication server is typically based on WebRTC technology and can be installed on a (telephone) terminal, for example.

The following abbreviations are explained below:
ATC: Advanced Telephony Connector
App: Application software, Web application
CCS: Cloud Communications Server
CSTA: Computer Supported Telecommunications Applications (ECMA)
CTI: Computer Telephony Integration (e.g., CSTA, TAPI)
GTC: Generic Telephony Connector
PBX: Telecommunication installation, Telecommunication platform, Switch
SaaS: Software as a Service
SIP: Session Initiation Protocol
TC: Telecommunication
UTC: Universal Telephony Connector
VoIP: Voice over IP
WebRTC: Web Real-Time Communication As web-based real-time communication solutions based on WebRTC technology continue to roll out, integration with the available, mostly SIP-based VoIP/Video-over-IP platforms is next in line.

It will allow SIP-based IP telephones to also be used as additional terminals or terminal devices for a TC platform user. However, many manufacturers of IP-based PBXs or TC platforms (so-called Converged Systems) and also soft PBXs are using other protocols such as H.323 or proprietary protocols tunneled through standard protocols. The SIP-T (trunking) standard has become the choice for connectivity to public networks.

The first step of integration involves just connectivity, i.e., basic call capacity without performance features. For this, the SIP border proxy was adapted for secure connections with other SIP domains to become a so-called Universal Telephony Adapter (UTC). In addition to interworking between WebRTC protocols and SIP-T, the UTC also performs address translation and registers a WebRTC client on a cloud communication server (CCS) at the SIP proxy/registrar on a TC platform (PBX). Because this is a 1:1 relationship between the WebRTC client and the SIP trunking terminal, a logical participant association with the supporting WebRTC client can be made based on the telephone number of the SIP trunking terminal. This integrates the WebRTC client into the PBX or TC platform with switching capabilities, so that it functions for outgoing and incoming calls.

This is demonstrated in the utility model DE 20 2011 003 225 U1. Here all additional actions of the external participant are linked (associated) with a participant's device as part of Call Processing. The participating device used is a so-called virtual device, i.e., a device with no physical connection. The physical connection, i.e., to the SIP trunk representing the UTC, is accomplished by association. This virtual participant thereby takes on the properties of the CCS client and simultaneously represents it during Call Processing. In this case, the WebRTC client (CCS client) assignment of a cloud communication server (CCS)/UTC/SIP trunk/virtual participant to a TC platform (PBX) is a "1-to-1" or "1:1" relationship.

BRIEF SUMMARY OF THE INVENTION

Analysis of TC platform use scenarios and use cases identified several advantageous performance features such as hold, query, transfer, manual call forwarding, and automatic call forwarding, in particular between clients and terminals etc. In order to control these performance features, the UTC was adapted to become the Advanced Telephony Connector (ATC). For performance feature signaling with the ATC, the proprietary-construct CTI protocol CSTA over SIP can be used, which can be interpreted by SIP-based platforms and is already being used by mobile UC clients.

This invention addresses the issue of how performance features can be used in such a configuration without proprietary signaling by most, if not all, manufacturers.

According to embodiments of the invention, the performance features function optimally without the need for performance feature signaling in SIP. However, at least two resulting connections should be associated while the performance features are running. To address this the invention has the port handler according to the invention, which associates multiple SIP-T connection terminals depending on the participant's number and displays the SIP-based switching as a (virtual) user. For this, the invention uses a feature of today's WebRTC clients, allowing it to take part in only one active RTC session at a time. However, the method can work even for multiple simultaneous sessions. Using this method, CCS clients (integrated through a UTC, for example) can have expanded access to the call control for the connected TC platform.

The aforementioned UTC and ATC connectors use two different approaches for connecting CCS clients to a TC platform. In UTC, CCS clients are integrated through SIP connection processes (trunking), and in ATC through SIP participant processes (endpoint). Integrating WebRTC clients through SIP participant processes allows for easily expanded call control, with deeper access to the performance features of the connected TC platform. For example, the WebRTC client uses CSTA over SIP to control the assigned telephone. With CSTA, it is possible to exchange call processing information between a TC platform and an application, and the application is then able to influence the call processing of the TC platform.

When the method according to the invention is applied, the signaling necessary to execute performance features (e.g., query) is directed to Call Processing through the CCS client registered on the UTC by means of a second port (here SIP trunk, for example). This requires the implementation of an "n-to-1" relationship (also designated as "n:1") as part of call processing. For this process, the (virtual) device handler is abstracted by a universal port handler according to the invention.

In the "n-to-1" implementation, n instances of ports (here, SIP trunks) indicate one user, who represents the CCS client in call processing. As part of call-processing implementation, the user can have functional or stimulus-controlled signaling. As opposed to functional signaling (by SIP participant, for example), in stimulus signaling (most of which is proprietary) the instance representing the user essentially has no switching status. For the method described here, in call processing implementation, stimulus signaling and functional signaling are established independently of the selected approach.

For example, the method described here uses native SIP trunking means exclusively and is also operated through a so-called "3rd-party SIP server," so it is also possible to add completely different protocols to the call control of a PBX ("Skinny" from Cisco, for example) in order to achieve expanded call control for integrated WebRTC clients, for example, and their assigned telephones.

Applied to the technique in use, this means that the proprietary WebRTC with CSTA-enriched SIP participant tunnel of the ATC is completely replaced by a native SIP trunk of the UTC with simultaneous preservation of the planned expanded call processing control.

With respect to the use of the term "integration," it should be noted that integration here is described mostly with regard to the TC platform that makes it possible to integrate WebRTC clients, for example. Conversely, cloud communication servers such as "Unify Circuit" and "Skype for Business" provide options for integrating TC platforms.

DETAILED DESCRIPTION OF THE INVENTION

Figure 1:
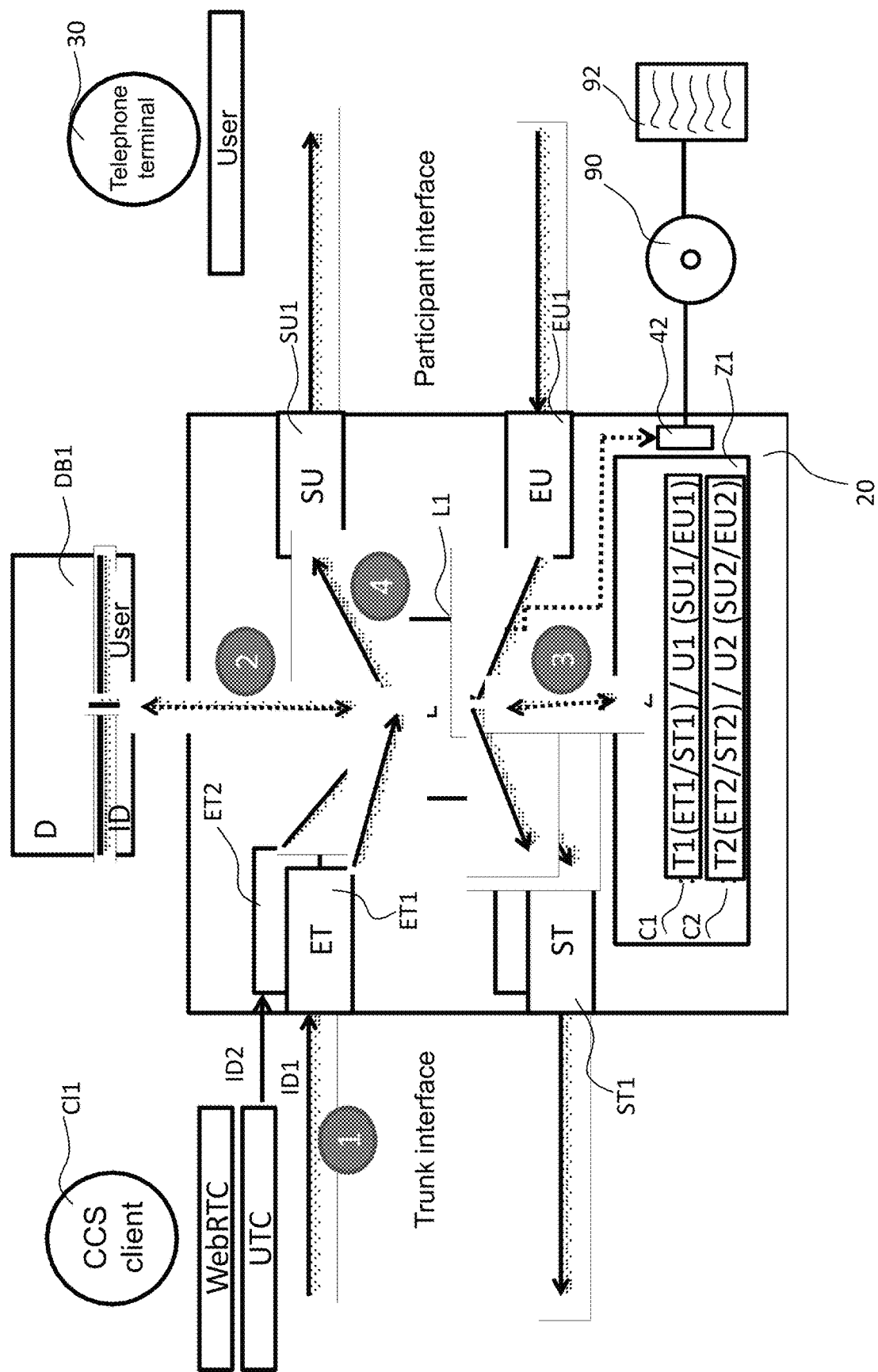
FIG. 1 a general configuration for one embodiment of the port handler according to the invention, FIG. 2 a general configuration representing an "n-to-1" assignment for performance features, FIG. 3 a flow diagram representing an "n-to-1" assignment for a query, FIG. 4 a process diagram showing the steps executed in the port handler for a communication with call routing from a client to a UTC, FIG. 5 a flow diagram representing an "n-to-1" assignment for call waiting, FIG. 6 a process diagram showing the steps executed in the port handler for a communication with call routing from a UTC to a client, FIG. 7 a flow diagram representing an "n-to-1" assignment for automatic call forwarding, FIG. 8 a flow diagram representing an "n-to-1" assignment for call pickup, FIG. 9 a schematic representation of networking through the use of port handlers, FIG. 10a schematic representation of a port handler as a call-instance-based unit for an incoming call, FIG. 11 a schematic representation of a port handler as a call-instance-based unit for ending an incoming call, FIG. 12 a schematic representation of a port handler as a call-instance-based unit for an outgoing call, and FIG. 13a schematic representation of a port handler as a call-instance-based unit during an outgoing call.

FIG. 1 shows one embodiment of the invented port handler 20, with which the method according to the invention in particular can be implemented as described below.

The port handler 20 includes a (central) logic unit L1, multiple trunk receiving units ET1, ET2, multiple trunk sending units ST1, ST2, a user sending unit SU1, a user receiving unit SU1, and an allocation table (storage device) Z1 for assigning the above-named components relative to each other. The port handler 20 is connected to a database DB1 for storing identification IDs and users, a CCS client CI1, and a telephone terminal 30 assigned to the user of a TC platform.

The port handler 20 includes a control device 42, which executes the method based on the invention using a schematically represented computer program 92 (stored on a CD-ROM 90 as an example of a data carrier). Here the logic unit L1 of the port handler 20 transmits a first call C1 through the first trunk receiving unit ET1 representing a first trunk T1 to the first sending unit SU1 assigned to the user U1. By processing a first identification ID1 received through the first trunk receiving unit ET1, the logic unit L1 assigns the first trunk receiving unit ET1 and the first call C1 to the user U1, using the (appropriately structured) database DB1 and the allocation table Z1. The logic unit L1 then transmits at least a second call C2 through the second trunk receiving unit ET2 representing at least a second trunk T2 also to the sending unit SU1 assigned to the user U1, and by processing a second identification ID2 received through the second trunk receiving unit ET2, the logic unit L1 assigns the second trunk receiving unit ET2 and the at least second call C2 also to the user U1, using the database DB1 and the allocation table Z1. Next, the switching-capable sending unit SU1 assigned to the user U1 and the switching-capable receiving unit SU1 assigned to the user U1 use the client CI1 to effect call control for the first call C1 and the at least one second call C2 to the telephone terminal 30 representing the user U1.

Figure 2:
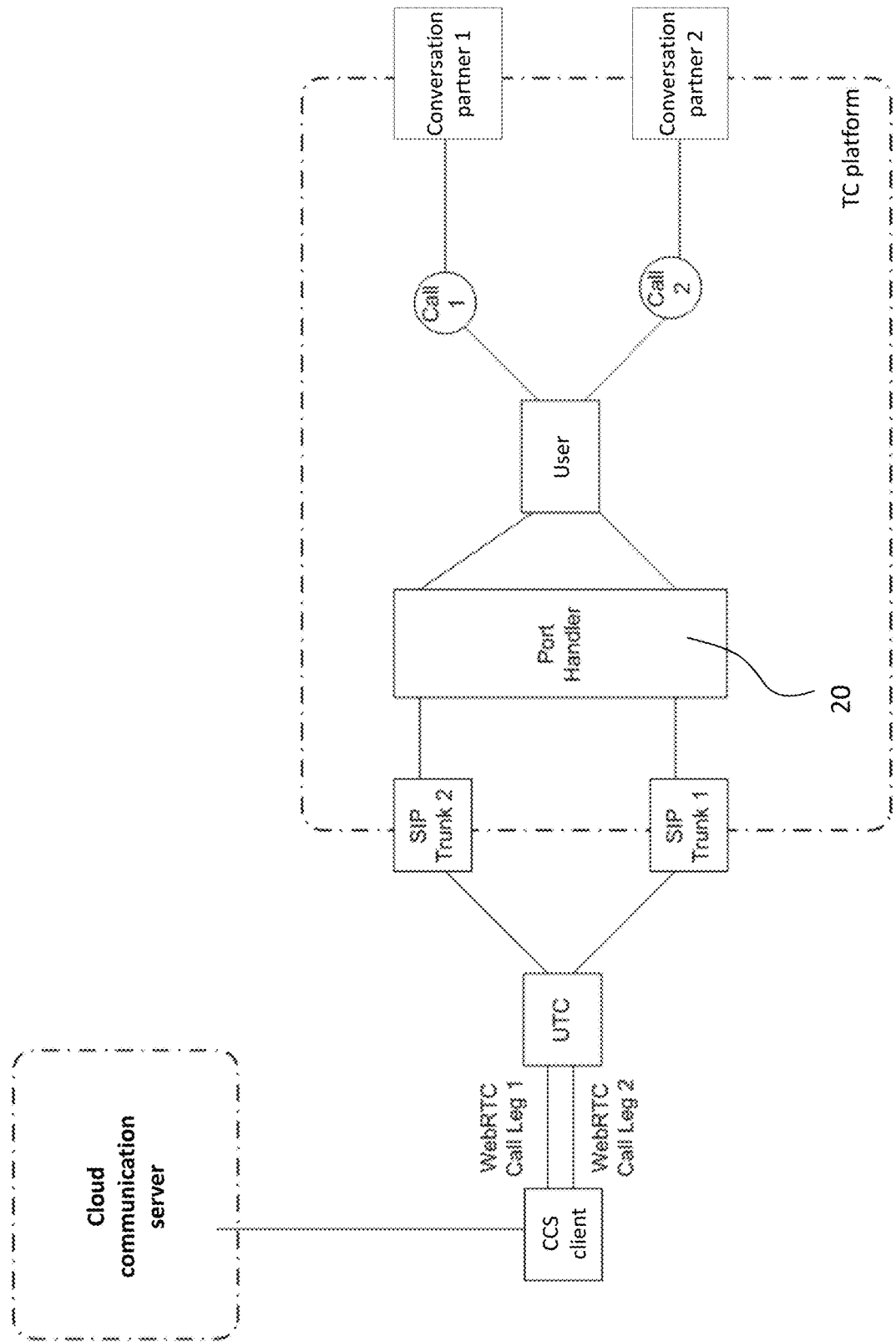

FIG. 2 shows an "n-to-1" assignment for performance features. The number of telephone connections ("call legs") between the client and UTC is determined by the implementation and/or capabilities of WebRTC and does not depend on system implementation. It is not essential to the invention whether one CCS client establishes n connections or n CCS clients each establish one connection to the UTC.

The terminal assigned to the user of a TC platform can therefore be operated in the "stimulus" or "functional" operating mode.

This process now allows the user, through his CCS client, to execute various performance features using the terminal most recently registered on the UTC for call processing on an integrated TC platform.

With the port handler 20, the "normal" user instance is addressed in call processing (CP). This means that the core components in CP do not need any knowledge of the SIP trunks used, so a trunk interface is converted to a user interface.

The conversation partners 1 and 2 can in turn represent another CCS client.

Figure 3:
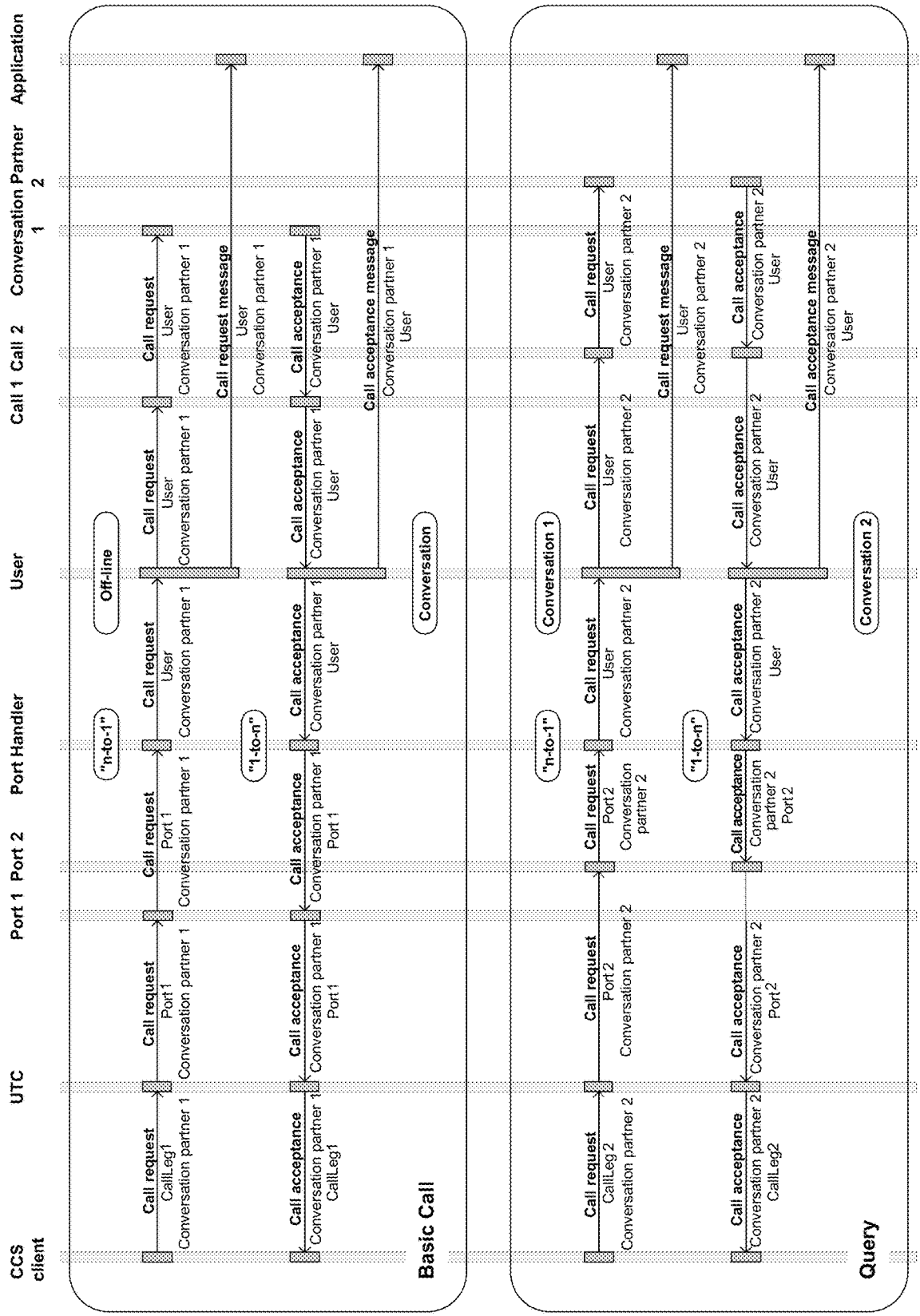

FIG. 3 shows an example of one execution of the method according to the invention for queries with a corresponding "n-to-1" assignment for a query. A call request Call 1 on a CCS client—represented in the TC platform by a user (telephone terminal)—was accepted by a target or conversation partner 1 on the TC platform. Consequently, the CCS client guides a query regarding Call 2 to a target or conversation partner 2 on the TC platform. As an option, a suitable implementation in Call Processing makes it possible to send call processing status messages to an application assigned to the CCS client, for example.

Figure 4:
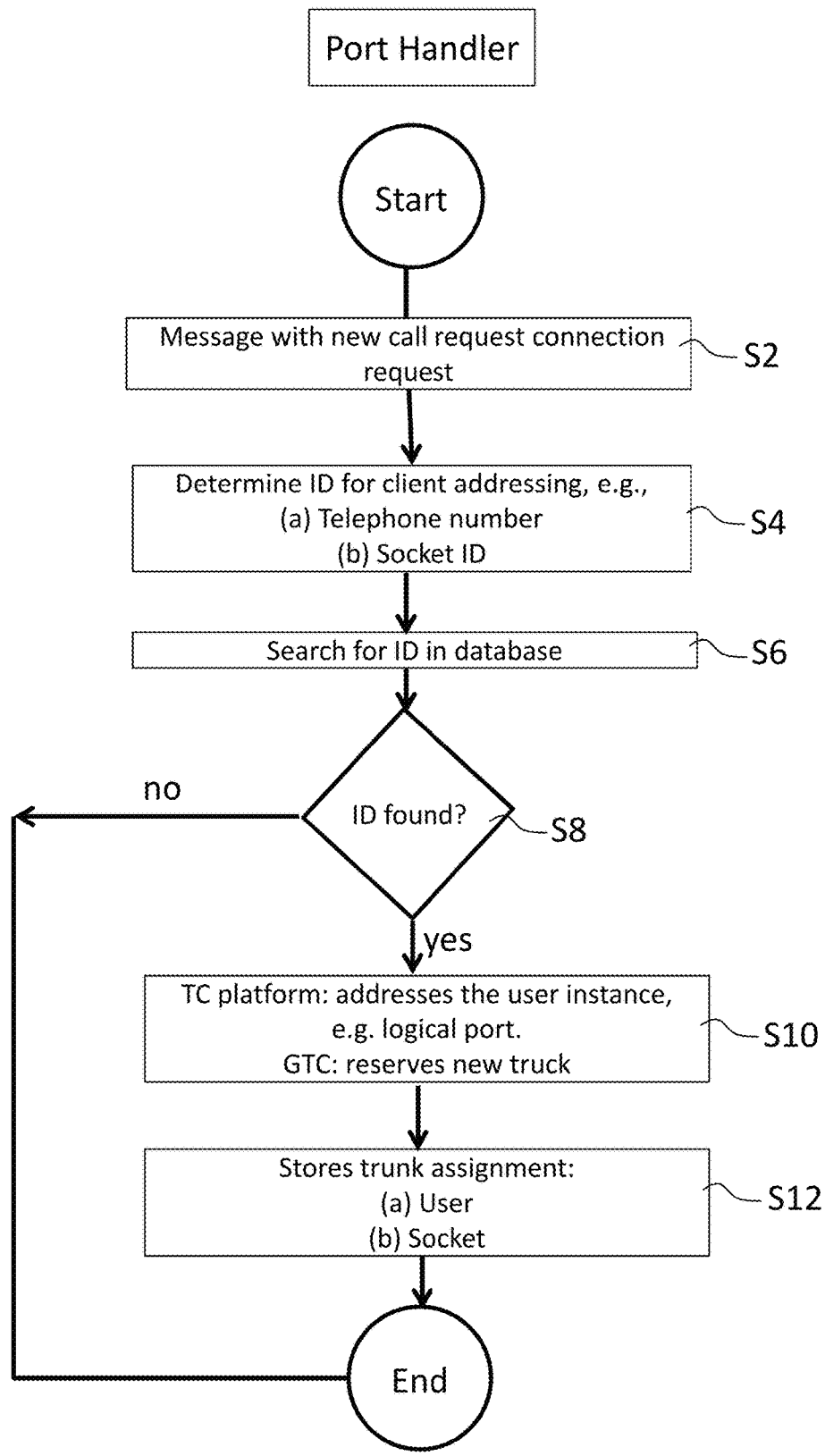

The purpose of the port handler 20 for calls from CCS clients to the TC platform is to determine or ascertain the associated user instance (telephone terminal) or the initiating CCS client. Conceptually, the port handler 20 can be implemented as a component of the TC platform (a) or as a component of the UTC (b). The process for this is described below according to FIG. 4: In step S2 the port handler 20 receives a call request message for a first call request Call 1 as in FIG. 3 and FIG. 1 with a new connection request, after which in step S4 an ID (or identification) for addressing the CCS client is determined or ascertained. The ID can be, for example, for concept (a), the telephone number assigned to the CCS client in the TC platform and, for concept (b), the socket connection assigned to the CCS client's TC platform. Next, in step S6, the system searches for the ID in the database DB1. If the ID is not found after searching in step S8, the process ends. Otherwise, in step S10, by means of the logic unit as in FIG. 1, the port handler 20 sends a command to the TC platform to address the user instance (a), or a command to the UTC to assign a new trunk (b). Next, in step S12, the assignment between trunk and user (a) or between socket and trunk (b) is stored in the allocation table Z1, which ends the process.

Figure 5:
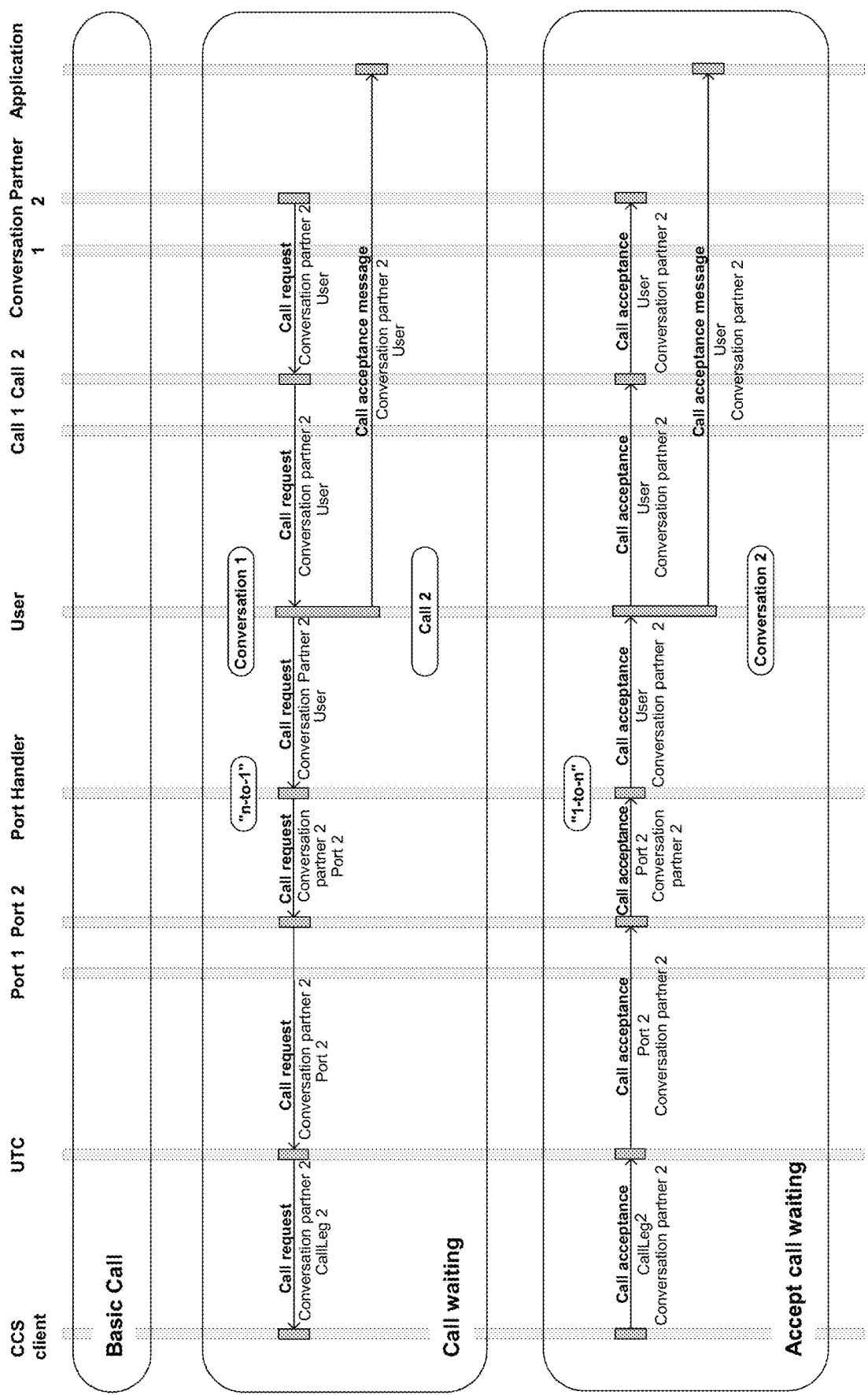

FIG. 5 shows an example of one execution of the method according to the invention for call waiting with a corresponding "n-to-1" assignment for call waiting. A call request Call 1 on a CCS client—represented in the TC platform by the user (telephone terminal)—was accepted by a conversation partner 1 on the PBX. Consequently, a conversation partner 2 of the TC platform calls the CCS client. Call 2 waits for the user (telephone terminal), and the CCS client accepts the waiting call. Call 1 is still active and marked in Call Processing as ongoing. As an option, a suitable implementation in Call Processing makes it possible to send call processing status messages to an application assigned to the CCS client, for example.

Figure 6:
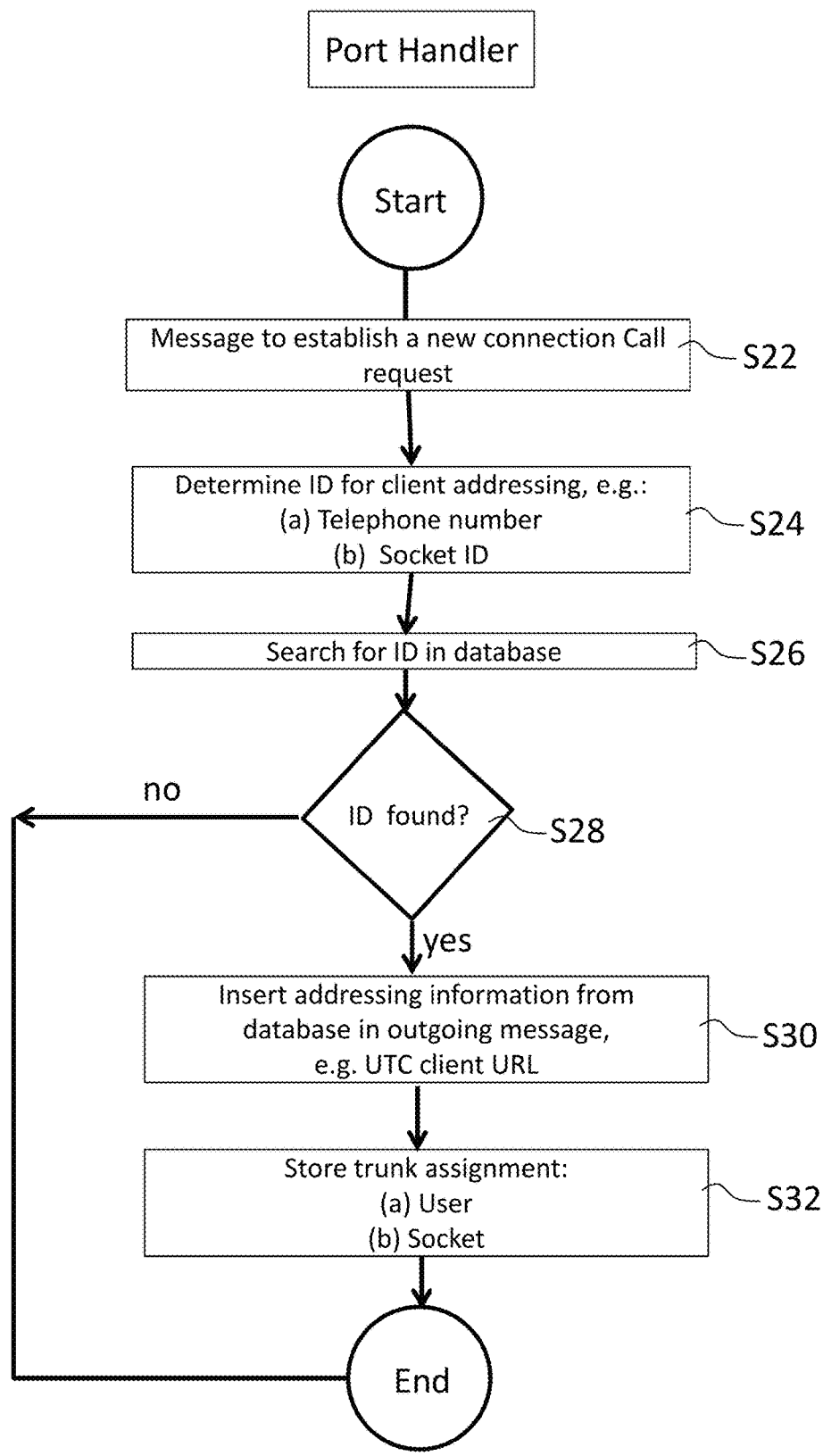

For calls to the TC platform, a purpose of the port handler 20 is also to determine and address the associated user instance or appropriate socket connection. The process for this is described below according to FIG. 6: In step S22 the port handler 20 receives a call request message—for establishing a new connection—after which in step S24 an ID (or identification) for addressing the CCS client is determined or ascertained. The ID can be, for example, for concept (a), unique the telephone number assigned to the CCS client in the TC platform and, for concept (b), the socket connection assigned to the CCS client's TC platform. Next, in step S26, the system searches for the ID in the database DB1. If the ID is not found after searching in step S28, the process ends. Otherwise, in step S30 the port handler 20 inserts addressing information from the database DB1 into an outgoing message to the CCS client. This addressing information can be, for example, the URL of the CCS client. Next, in step S32, the assignment between user and trunk (a) or between trunk and socket (b) is stored in the allocation table Z1, which ends the process.

Figure 7:
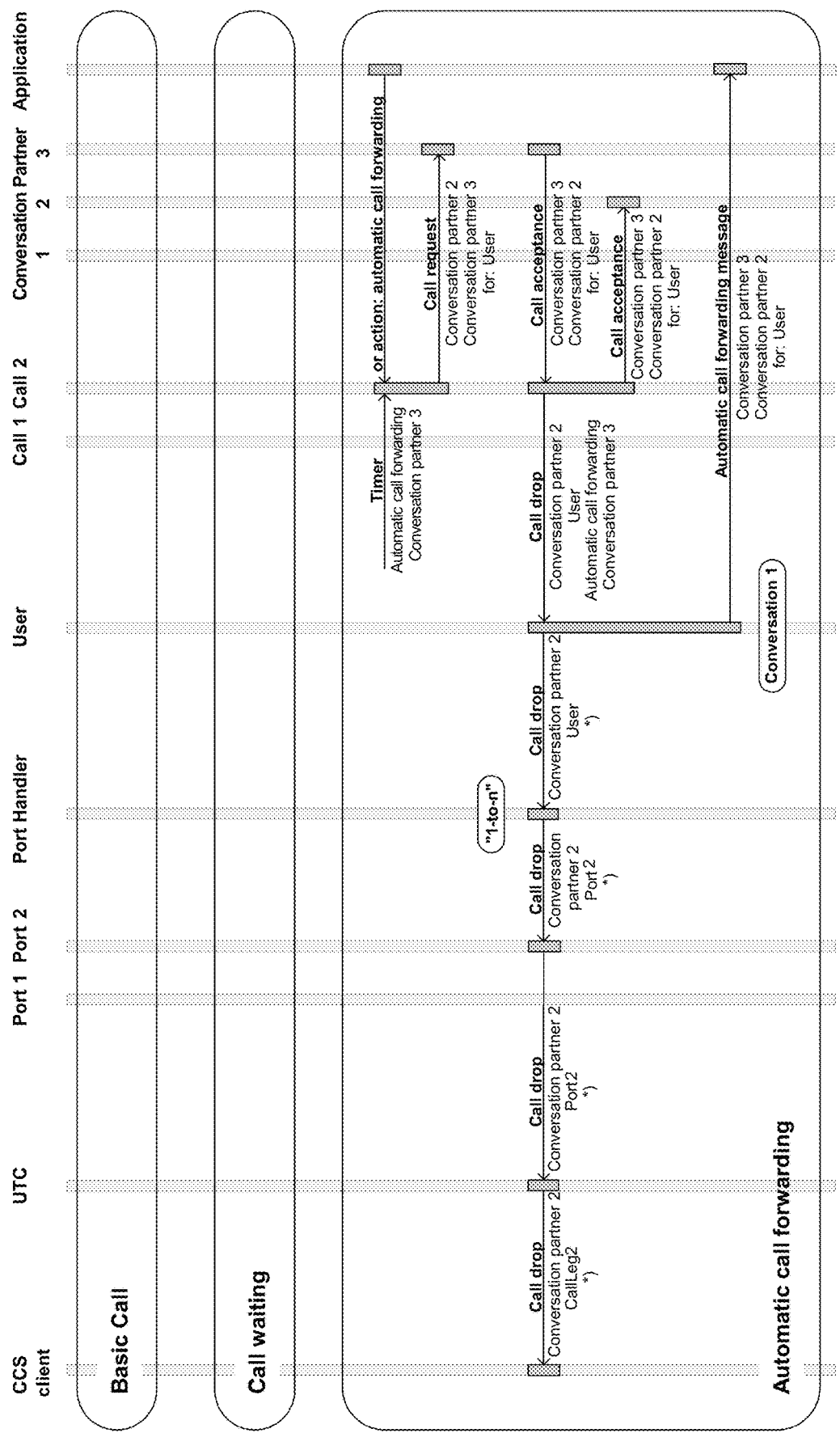
Figure 8:
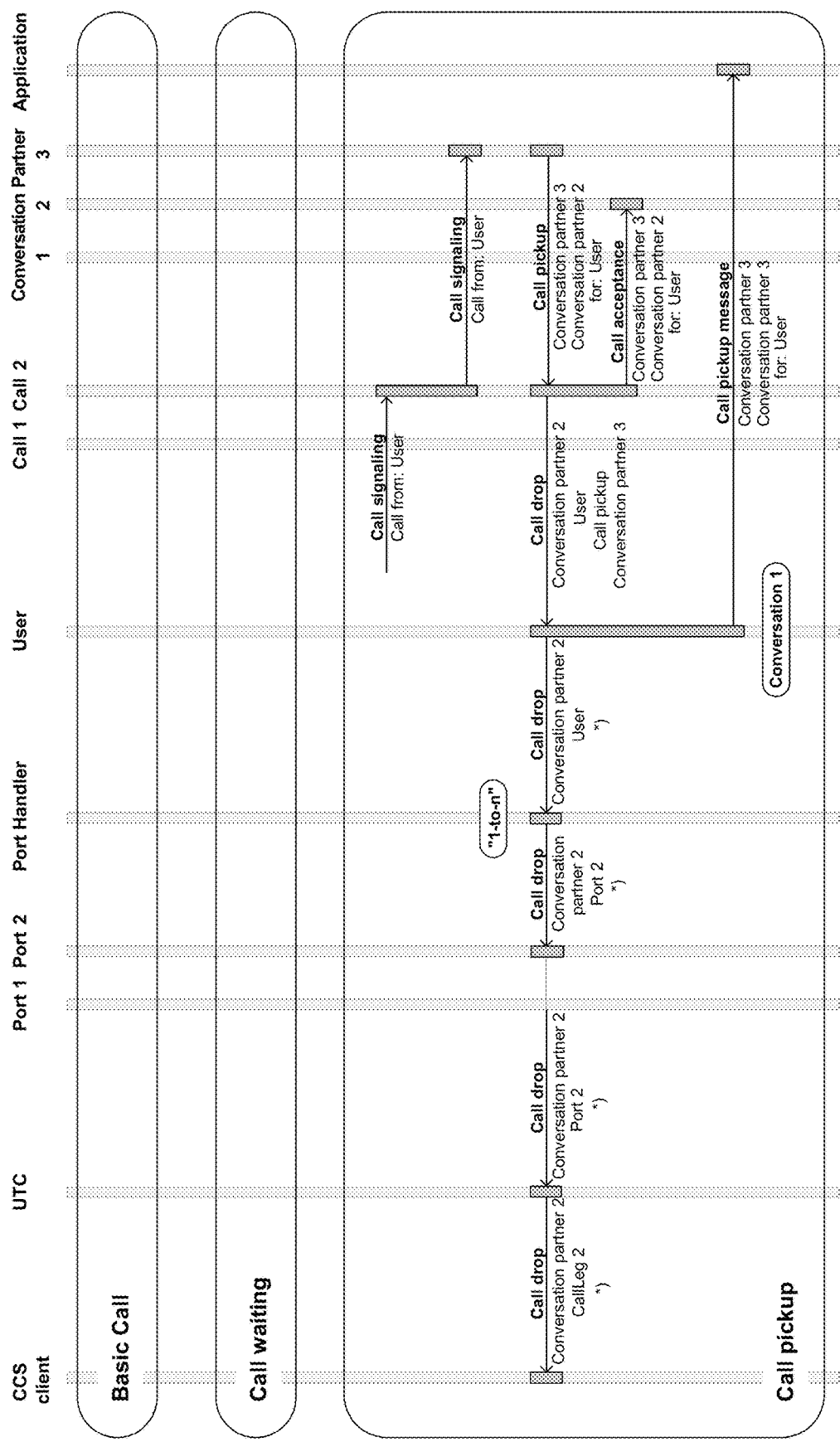

FIG. 7 shows an example of one execution of the method according to the invention for automatic call forwarding with a corresponding "n-to-1" assignment for automatic call forwarding, and FIG. 8 shows the same for call pickup. At some point a call request Call 1 from a CCS client—represented in the TC platform by the user (telephone terminal)—was accepted by a conversation partner 2 on the PBX and is correspondingly marked in Call Processing as ongoing.

In the case of automatic call forwarding, Call Processing forwards the call 2 to a target 3 or a conversation partner 3, based on a timer, an action by an application assigned to the CCS client, for example, or another similar event. If the conversation partner 3 accepts the call, then the call 2 to the CCS client is dropped.

In the case of call pickup, Call Processing or an application signals the call 2 to a conversation partner 3. If conversation partner 3 now takes the call by means of an action on the terminal, an action of an application assigned to the conversation partner 3, for example, or another similar event, then the call 2 to the CCS client is dropped.

The conversation partners 1, 2, and 3 shown in the preceding figures can also represent other CCS clients.

During execution of the expanded call control performance features, the CCS clients can be responsible for controlling payload. This means that the payload from Call 1 can be switched independently of the payload from Call 2. Payload administration in the TC platform is also possible.

Figure 9:
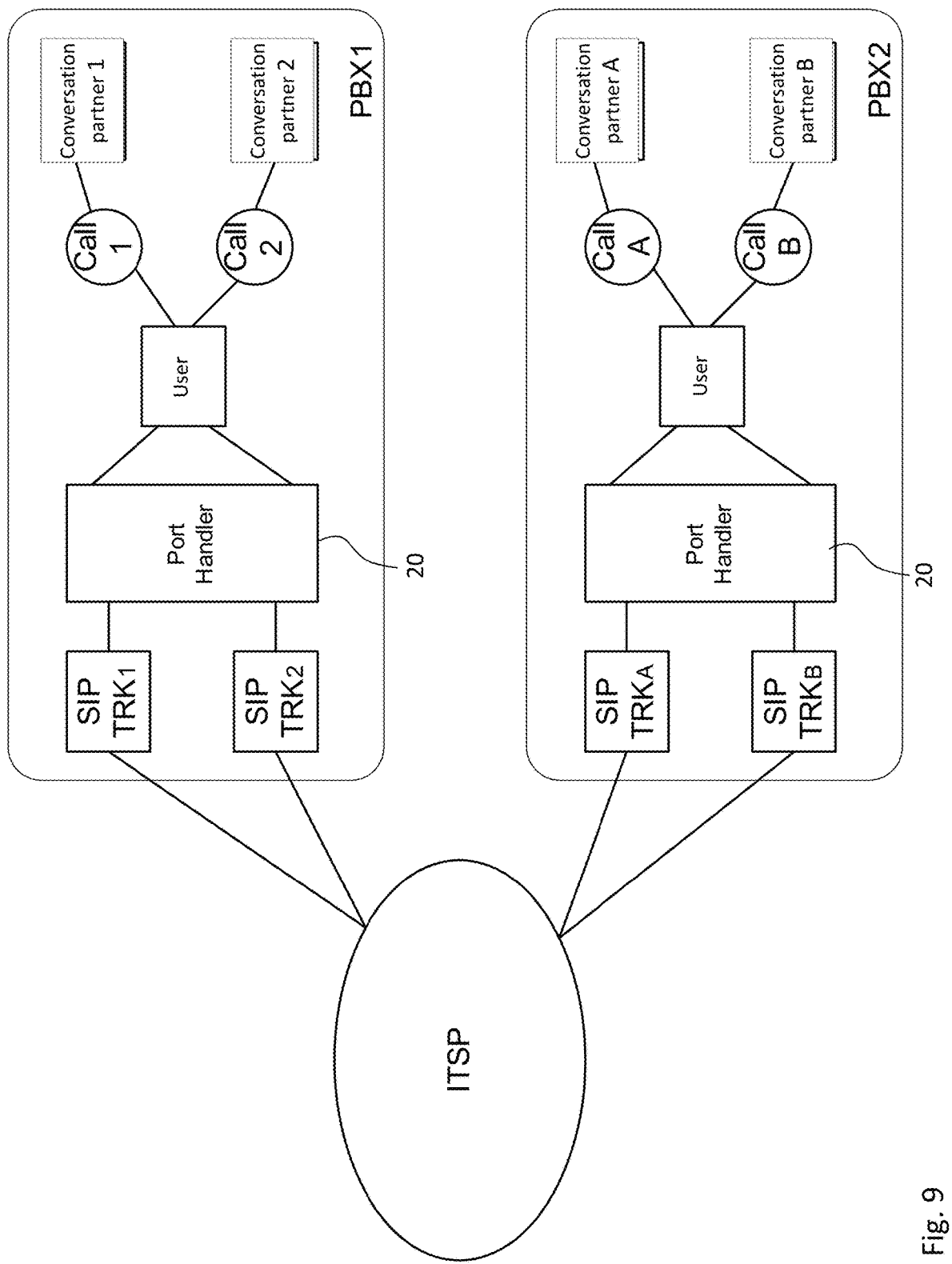

The described method can also be used for networking TC platforms through native SIPs (if networking using SIP-Q is impossible, for instance) and also allows node-overlapping presence control as well as the use of group performance features. This networking via the port handler is shown in FIG. 9.

In one execution example, an employee alternates between working at the PBX1 and PBX2 locations. If a group comprising one participant each on TC platform PBX1 (telephone and user) and TC platform PBX2 (telephone and user) is created for him, it can be guaranteed that the status indication (busy signal, for example) will be correctly managed on both TC platforms for all other users.

Figure 10:
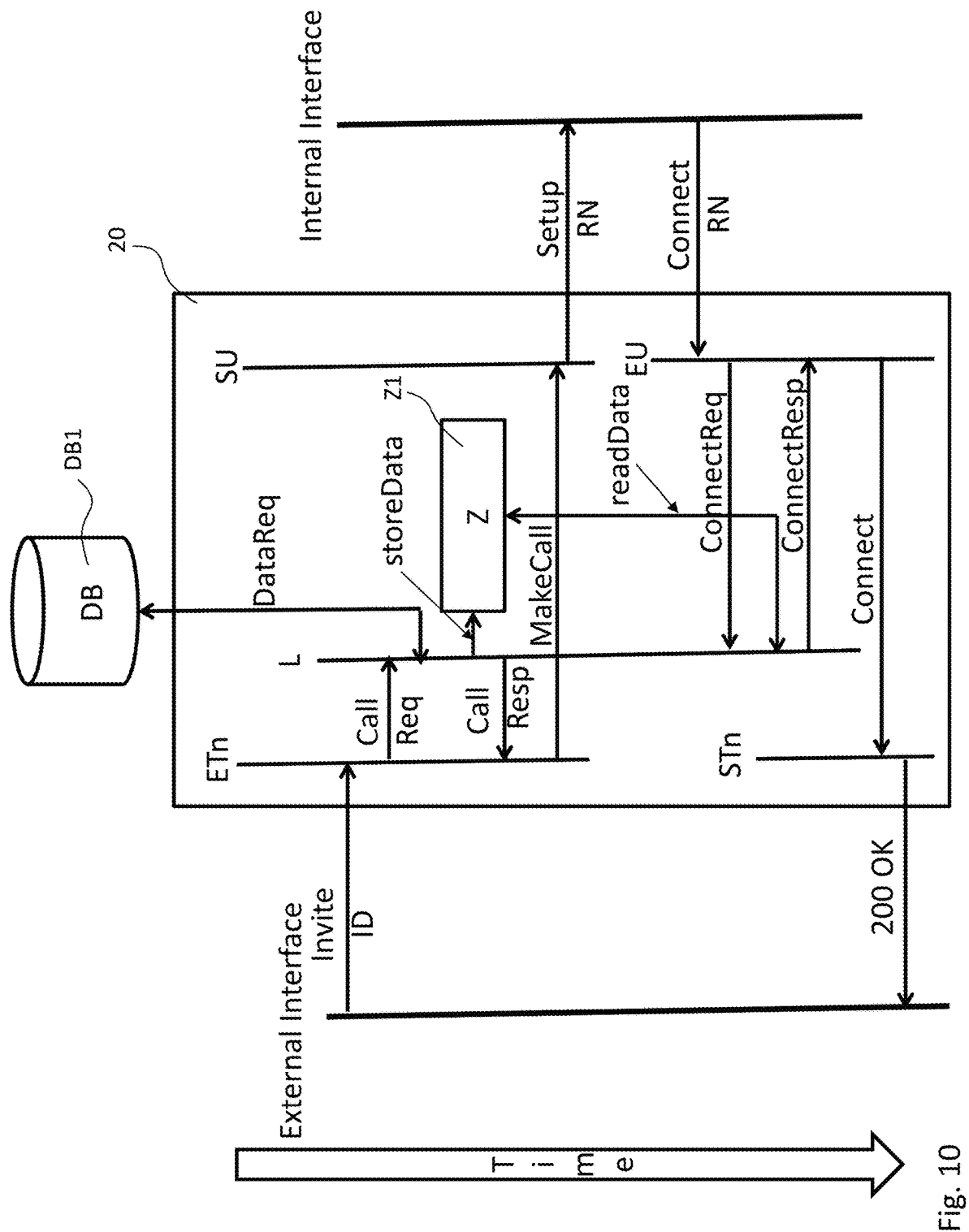
Figure 11:
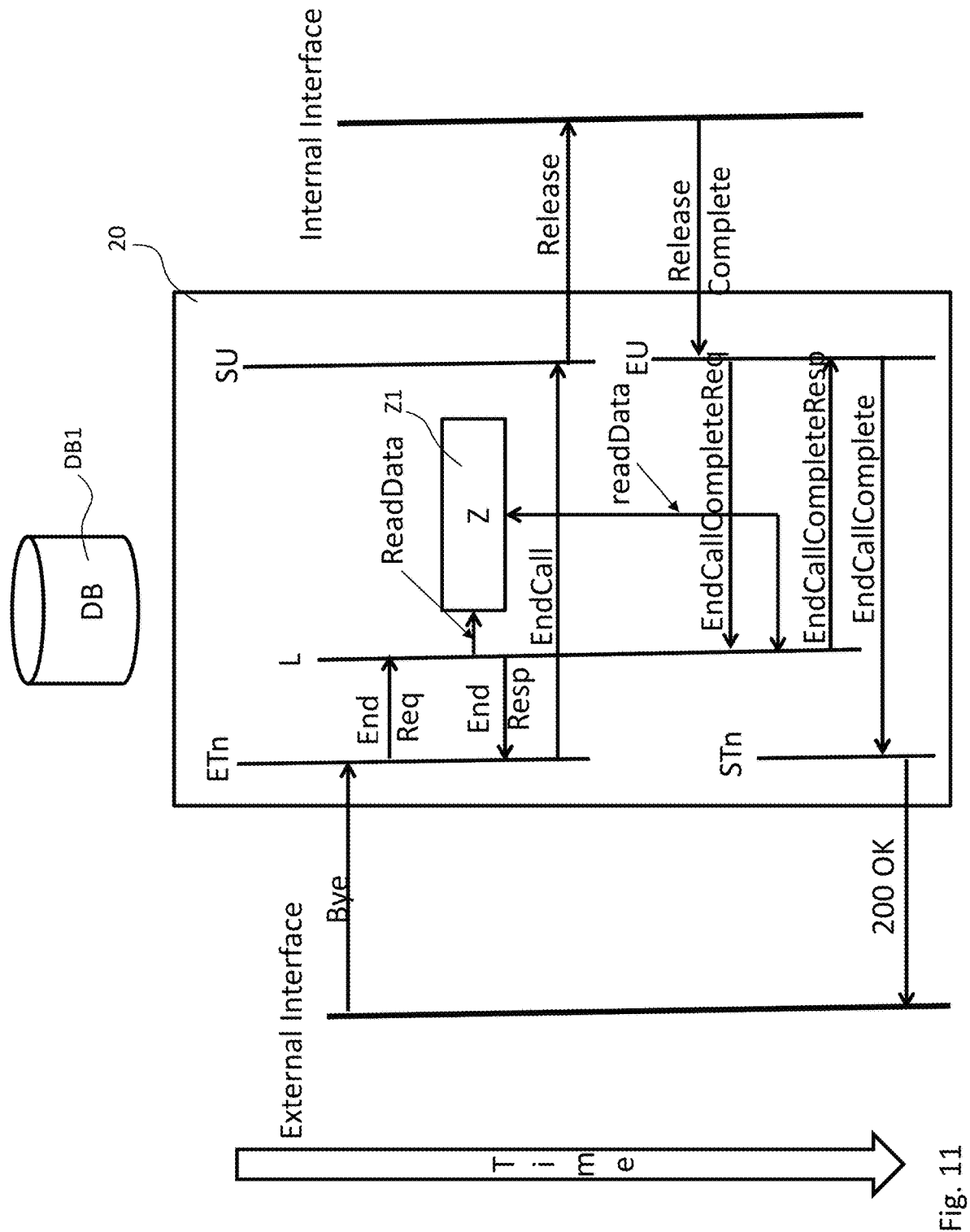
Figure 12:
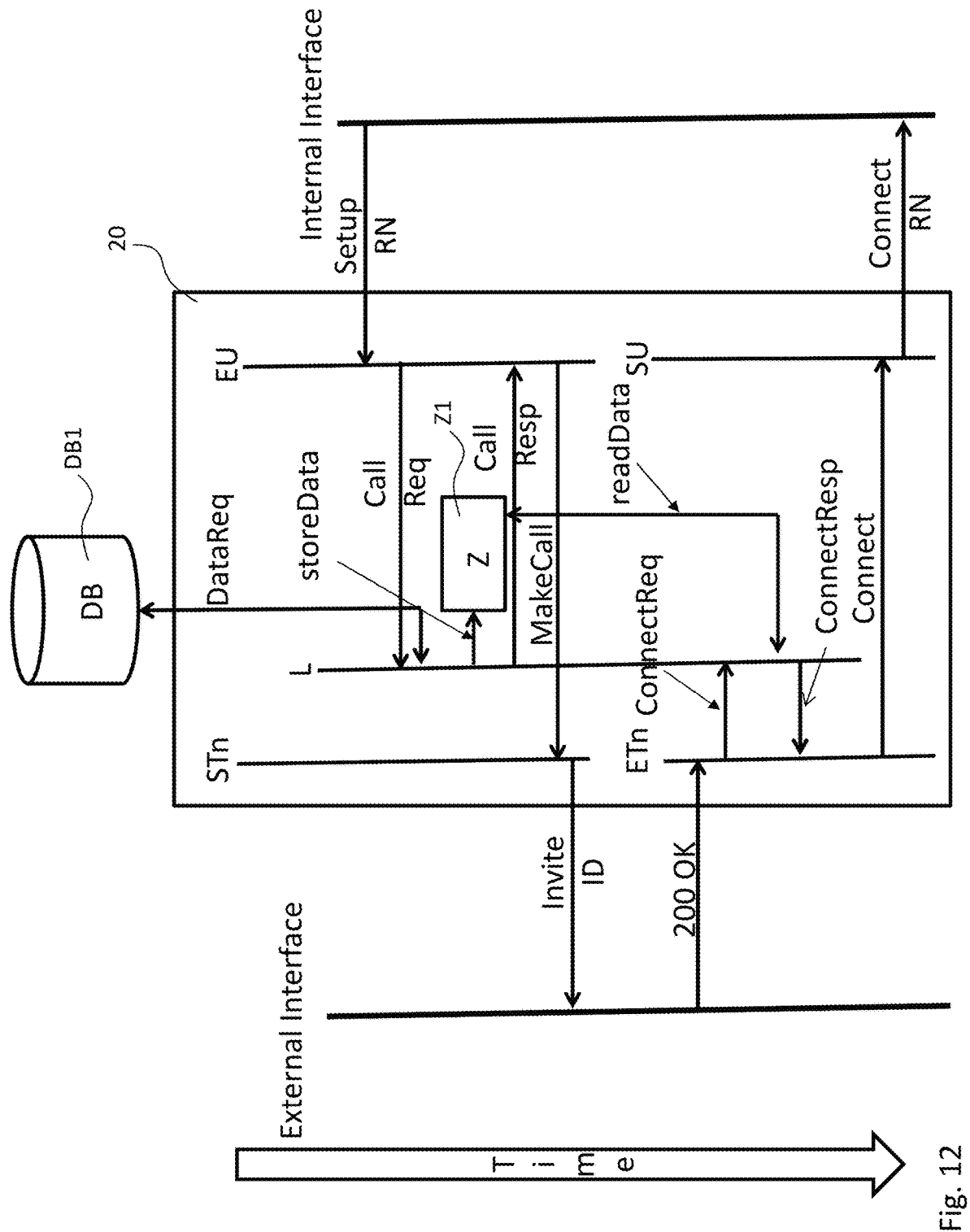
Figure 13:
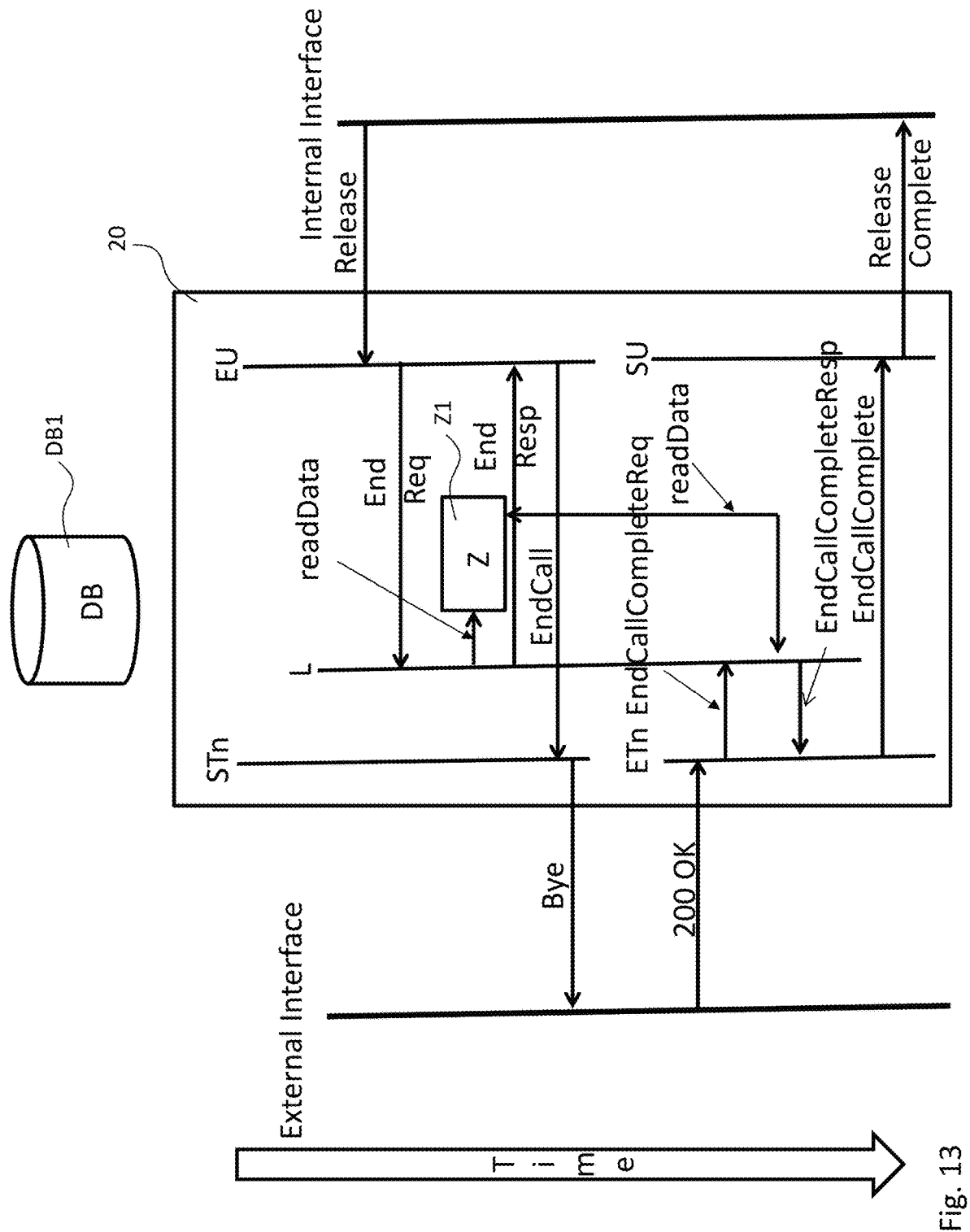

FIG. 10 shows an example of an embodiment of a port handler 20 as the connection element between a CCS client (external interface) and a call processing unit (internal interface), here for an incoming call. In this case, the port handler 20 assigns an ID received through a trunk receiving unit ET1 (see, e.g., FIG. 1) for at least a first incoming call on an SIP trunk (SIP: Invite) to the user using a logic unit L1 and an appropriately structured database DB1 and allocation table Z1. After successful assignment, the incoming call is forwarded through the internal interface of the sending unit SU1 to the call processing unit and thereby to the telephone 30 representing the user or his telephone number (TC platform internal: MakeCall/Setup). If the user answers the call, the port handler 20 receives a connect indication through the internal interface of the user's receiving unit SU1 and forwards that indication through the trunk sending unit ST1 to the client (SIP: OK). A query according to FIG. 3 and assignment to the sending and receiving units of the internal interface then takes place through the instances of the receiving and sending units of the external interface.

According to FIGS. 10 to 13, there can be multiple respective instances of units:

Instance of the trunk receiving unit: ETn (n=1 . . . N) corresponding to call instance Cn (n=1 . . . N)

Instance of the trunk sending unit: STn (n=1 . . . N) corresponding to call instance Cn (n=1 . . . N)

Similar to FIG. 10, FIGS. 11 to 13 show embodiments of a port handler 20 as the connecting element between a client (external interface) and a call processing unit (internal interface), and also for ending an incoming call (incoming release), for an outgoing call, or terminating an outgoing call (outgoing release).

It should be understood that, with this invention, there is a correlation between features described with respect to method steps and features described with respect to corresponding equipment. In this regard, described method features are to be considered as equipment features that are part of the invention—and vice versa—even when this is not explicitly stated.

It should be noted that the features of the invention described by referencing the presented embodiments, for example the type and configuration of individual components of the telecommunication system, individual announcements, signals, and parameters, can also be present in other embodiments, unless stated otherwise or prohibited for technical reasons. Not all features of individual embodiments described in combination must necessarily always be implemented in any one particular embodiment.

LIST OF REFERENCE INDICATORS

20=Port handler
30=Telephone terminal
42=Control device
90=machine-readable data carrier
92=Computer program
C1=Call 1
C2=Call 2
Cl1=Client
DB1=Database
ET1/2=Trunk receiving unit 1/2
EU1/2=Receiving unit 1/2
ID1/2=Identification 1/2
L1=Logic unit
ST1/2=Trunk sending unit 1/2
SU1=Sending unit
T1/2=Trunk 1/2
U1=User
Z1=Allocation table

What is claimed is:

1. A computer-implemented method for executing call control for a client on a telephone terminal representing a user, comprising:

transmitting, through a logic unit of a port handler, a first call through a first trunk receiving unit representing a first trunk to a first sending unit assigned to a user, the first sending unit being a switching-capable sending unit;

processing a first identification received through the first trunk receiving unit such that the logic unit assigns the first trunk receiving unit and the first call to the user using a structured database and allocation table, transmitting by the logic unit at least a second call through a second trunk receiving unit representing at least a second trunk also to the sending unit assigned to the user, processing a second identification received through the second trunk receiving unit such that the logic unit assigns the second trunk receiving unit and the at least second call also to the user using the database and allocation table, and the first sending unit assigned to the user and a switching-capable receiving unit assigned to the user using the client to carry out call control for the first call and the at least one second call for the telephone terminal representing the user such that payload of the first call is switchable independently of payload of the at least one second call.

2. The method of claim 1, wherein the user is a first user and the method also comprising:

the port handler accepting a request from a client for a second call and directs it to a second user, to query the second user.

3. The method of claim 1, wherein the user is a first user and the method also comprising:

the port handler accepting a request for a second call from a second user and directs it to the client, to place it in call waiting status for the first user.

4. The method of claim 3, comprising signaling the second call at a third target and automatically forwarding the second call from a second target to a third target or accepting the call at the third target by call pickup.

5. The method of claim 1, further comprising creating a respective group from a port handler and a user in a telecommunication platform for multiple telephone platforms that are networked with each other, such that that a status indication and/or busy signal reaches all other users in both telecommunication platforms.

6. A non-transitory computer readable medium having a computer program product stored thereon, the computer program comprising executable code that, when executed by a port handler, causes the port handler to carry out a method, the method comprising:

transmitting, through a logic unit of the port handler, a first call through a first trunk receiving unit representing a first trunk to a first sending unit assigned to a user, the first sending unit being a switching-capable sending unit;

processing a first identification received through the first trunk receiving unit such that the logic unit assigns the first trunk receiving unit and the first call to the user using a structured database and allocation table, transmitting by the logic unit at least a second call through a second trunk receiving unit representing at least a second trunk also to the sending unit assigned to the user, processing a second identification received through the second trunk receiving unit such that the logic unit assigns the second trunk receiving unit and the at least second call also to the user using the database and allocation table, and the first sending unit assigned to the user and a switching-capable receiving unit assigned to the user using the client to carry out call control for the first call and the at least one second call for a terminal representing the user such that payload of the first call is switchable independently of payload of the at least one second call.

7. The non-transitory computer readable medium of claim 6, wherein the terminal is a telephone terminal, a computer, a smart phone, or a telephone.

8. A port handler for executing call control for a client on a telephone terminal representing a user, comprising:
a logic unit,
a first trunk receiving unit representing a first trunk,
a second trunk receiving unit representing at least one second trunk,
a first switching-capable sending unit assigned to a user, and
a first switching-capable receiving unit assigned to the user,
wherein the logic unit is equipped and configured such that:
a first call is transmittable through the first trunk receiving unit to the first switching-capable sending unit;
a first identification received through the first trunk receiving unit is processable such that the logic unit assigns the first trunk receiving unit and the first call to the user using a structured database and allocation table,
at least a second call is transmittable through the second trunk receiving unit to the first switching-capable sending unit,
a second identification received through the second trunk receiving unit is processable such that the logic unit assigns the second trunk receiving unit and the at least second call also to the user using the database and allocation table, and
the first switching-capable sending unit and the first switching-capable receiving unit are assigned to the user using the client to carry out call control for the first call and the at least one second call for the telephone terminal representing the user such that payload of the first call is switchable independently of payload of the at least one second call.

9. The port handler of claim 8, wherein the client is a cloud communications server (CCS) client.

10. The port handler of claim 8, wherein the port handler is configured as a connection element between a client configured as an external interface and a call processing unit configured as an internal interface.

11. The port handler of claim 9, wherein the first identification is an address associated with the user or is a socket connection.

12. The port handler of claim 11, wherein the second identification is an address or a socket connection.

13. The method of claim 1, wherein the first identification is an address associated with the user or is a socket connection.

14. The method of claim 13, wherein the second identification is an address or a socket connection.

15. The method of claim 1, comprising switching the payload of the first call and the payload of the at least one second call independently.

16. The method of claim 1, wherein the call control also includes providing an indication that indicates the telephone terminal is connected for a call.

* * * * *